United States Patent [19]

Paulin

[11] Patent Number: 5,085,330
[45] Date of Patent: Feb. 4, 1992

[54] DRINKING BOTTLE ATTACHMENT

[76] Inventor: Kenneth R. Paulin, 13428 Oro Grande St., Studio A, Sylmar, Calif. 91342

[21] Appl. No.: 668,621

[22] Filed: Mar. 13, 1991

[51] Int. Cl.$^5$ .................. B65D 1/04; B65D 41/26; B65D 23/04
[52] U.S. Cl. .................. 215/6; 215/100 R; 215/1 A; 215/DIG. 8; 220/4.27; 220/713; 220/521; 220/23.86; 220/501; 220/903; 426/115; 426/120
[58] Field of Search .......... 215/100 R, 1 A, 6, 227, 215/DIG. 7, DIG. 8; 220/90.2, 90.4, 90.6, 85 R, 4.26, 4.27, 23.86, 23.83, 501, 505, 521, 524, 568, 903; 426/565, 566, 567, 115, 130, 120

[56] References Cited

U.S. PATENT DOCUMENTS

| | | | |
|---|---|---|---|
| 445,057 | 1/1891 | Harroun | 220/90.2 X |
| 2,562,496 | 7/1951 | Kirsch | 215/100 R |
| 2,569,139 | 9/1951 | Abelson | 220/90.2 X |
| 2,836,323 | 5/1958 | Robinson | 220/4.27 |
| 2,975,925 | 3/1961 | Chambers | 426/85 |
| 3,288,344 | 11/1966 | Woollen et al. | 426/120 X |
| 3,521,745 | 7/1970 | Schwartzman | 215/6 X |
| 3,978,233 | 8/1976 | Bolt | 215/100 R X |
| 4,102,451 | 7/1978 | Clarke et al. | 215/DIG. 8 X |
| 4,183,441 | 1/1980 | Erlandson | 215/100 R X |
| 4,428,498 | 1/1984 | Obey | 220/367 |
| 4,489,840 | 12/1984 | De Freitas | 220/90.4 X |
| 4,685,588 | 8/1987 | Kobayashi | 220/428 |
| 4,778,068 | 10/1988 | Kohus | 215/11.1 |
| 4,779,722 | 10/1988 | Hall | 215/DIG. 8 X |
| 4,823,946 | 4/1989 | Stoeffler et al. | 215/6 X |
| 4,850,496 | 7/1989 | Rudell et al. | 220/90.2 X |
| 4,907,724 | 3/1990 | Wing, Jr. et al. | 215/1 A X |
| 4,946,062 | 8/1990 | Coy | 220/90.4 |
| 4,961,510 | 10/1990 | Dvoracek | 220/90.4 |
| 5,005,717 | 4/1991 | Oilar | 215/1 A X |

*Primary Examiner*—Stephen P. Garbe
*Assistant Examiner*—Vanessa Caretto
*Attorney, Agent, or Firm*—Kelly, Bauersfeld & Lowry

[57] ABSTRACT

A drinking apparatus is provided for separately storing a carbonated beverage and ice cream in close proximity to one another, and for selectively mixing the beverage and the ice cream to provide a drink having the flavor of an ice cream float. The drinking apparatus is intended for use with a bottle having an upper threaded neck. The drinking apparatus includes a bottle attachment housing for storing the ice cream, having a threaded flange at one end dimensioned to engage the threaded bottle neck to secure the attachment housing to the bottle. A barrier is provided within the attachment housing for separating the ice cream from the beverage, and apertures through the barrier define a flow path from the bottle into the housing. A lower platform extends upwardly from the barrier to support the ice cream within the housing in a spaced relation relative to the barrier apertures. A housing cap is attached to the housing opposite to the drinking bottle and defines, with the housing, a chamber for the ice cream. The cap includes a spout through which the drink is drawn, and an upper platform extending downwardly into the chamber for supporting the ice cream in a spaced relation relative to the spout.

17 Claims, 2 Drawing Sheets

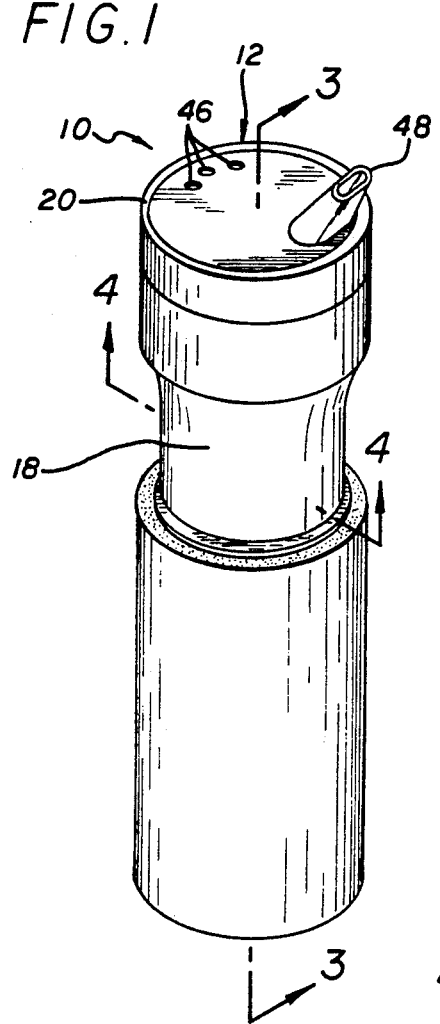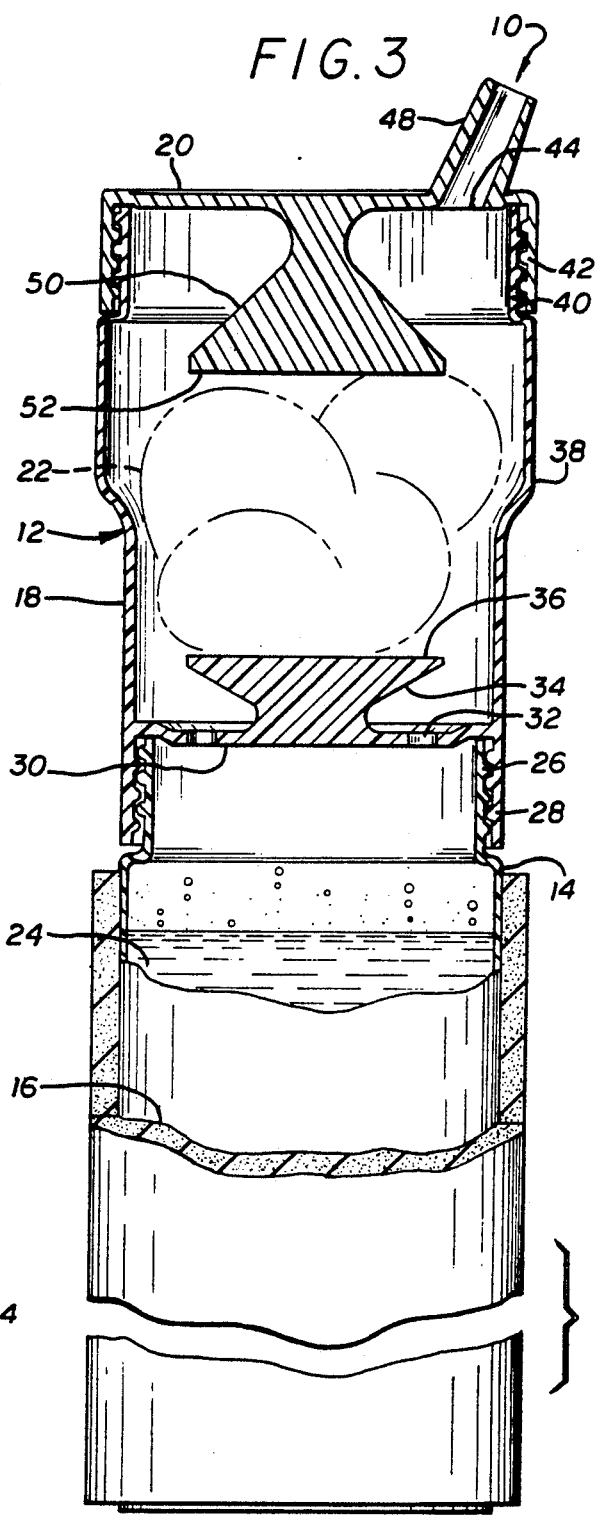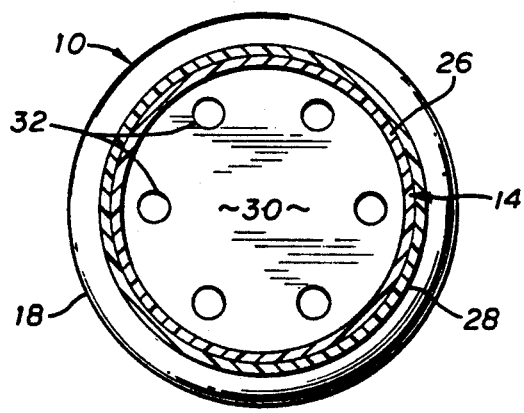

DRINKING BOTTLE ATTACHMENT

BACKGROUND OF THE INVENTION

This invention relates generally to beverage containers. More specifically, the present invention relates to an attachment for a drinking bottle, for storing an edible frozen substance such as ice cream in close proximity to, but separately from, a carbonated beverage in the bottle, and for selectively mixing the frozen substance and the beverage as the beverage is being drawn from the bottle.

Recently, in an effort to increase sales and profitability, many food markets which carry carbonated beverages (particularly soft drinks), have been offering "sports bottles" for sale, and in some cases as a give away item. A typical sports bottle is a twenty-two ounce or thirty-two ounce bottle having an upper threaded neck and a cap through which a plastic straw extends. Sports bottles provide a convenient container for soft drinks, particularly for those customers who do not have the time to sit down and enjoy the beverage at the point of sale. Such sports bottles have been particularly popular at mini-markets found at gasoline stations.

Sports bottles, which tend to be fabricated of a resilient flexible plastic material, offer several advantages over prior disposable paper or plastic cups which simply had a disposable plastic lid snapped over the upper rim for "to go" orders. For example, prior disposable cups and lids generally could not withstand rough handling or sudden impacts without leaking their contents. In contrast, sports bottles provide a relatively secure container for the fluid contents under such circumstances. Further, whereas the paper cups were disposable, the sports bottle can be cleaned and reused many times.

Sport bottles have provided an excellent alternative to prior disposable cups and lids, however, such bottles do not lend themselves well for use by consumers desiring to mix a frozen substance such as ice cream, with the beverage to attain a desired taste and consistency over a reasonable length of time. In particular, although the addition of ice cream to the beverage in the sports bottle to create a float will result in a satisfactory drink for a time, the ice cream will soon dissolve completely and the resulting drink will not have the same desirable characteristics as a freshly made ice cream float. The problem becomes apparent when one realizes that those who utilize sport bottles to transport a beverage from place to place tend to drink the beverage somewhat sporadically over an extended length of time.

Accordingly, there has been a need for a novel attachment to a drinking bottle for storing an edible frozen substance such as ice cream, in close proximity to, but separately from, a beverage in the bottle. Such a novel attachment should permit the beverage and the ice cream to be selectively mixed as the beverage is drawn from the bottle, to attain a desired taste. Further, such an attachment to a drinking bottle is needed which is of relatively simple construction and economical to produce. Moreover, a novel drinking apparatus is needed which is easy to clean and can be reused as desired. The present invention fulfills these needs and provides other related advantages.

SUMMARY OF THE INVENTION

The present invention resides in a novel attachment to a drinking bottle for storing an edible frozen substance in close proximity to, but separately from, a beverage in the bottle, and for selectively mixing the frozen substance and the beverage as the beverage is drawn from the bottle. The drinking bottle attachment comprises a housing having means for connecting the attachment to the drinking bottle, and a cap. The cap and the housing define a chamber, and platform means extend within the chamber for holding the frozen substance in a spaced relation relative to the cap and the bottle. An outlet is provided through the cap for permitting the beverage to be drawn out of the bottle through the housing.

In a preferred form of the invention, the drinking bottle attachment, together with the bottle, provide a novel drinking apparatus for separately storing a carbonated beverage and ice cream to provide a drink having the flavor of an ice cream float. The bottle typically includes a cup-like body for storing the beverage, and an upper threaded neck. An insulating jacket may be disposed about the bottle body if desired.

The bottle attachment housing is dimensioned to store a measured quantity of ice cream, and preferably is constructed of a low thermal-conductivity material. The housing includes a threaded flange at one end dimensioned to engage the threaded bottle neck to secure the attachment housing to the bottle, and a barrier situated adjacent to the threaded flange for separating the ice cream from the beverage. Means are provided for permitting the beverage to flow past the barrier into the housing, and in the illustrated embodiment this comprises a plurality of apertures through the barrier which define a flow path from the bottle into the chamber for the ice cream. A lower platform, forming a portion of the platform means, extends upwardly from the barrier for supporting the ice cream within the housing. The attachment housing further includes a second threaded housing end opposite to the housing threaded flange.

The cap includes a threaded flange dimensioned to engage the second threaded housing end to secure the cap to the housing. The outlet through the cap is defined by a spout which extends upwardly from the cap and which may be placed in a user's mouth to facilitate drawing a drink from the drinking apparatus. An upper platform, forming another portion of the platform means, extends downwardly into the chamber from the cap, for holding the ice cream in a spaced relation relative to the cap outlet.

The upper and lower platforms include facing planar surfaces for supporting the ice cream within the chamber. Each of the platforms are configured to have a generally conical configuration and provide a relatively small space between the platforms and a housing wall. This encourages intimate contact of the beverage with the ice cream and thorough mixing thereof as the drink is drawn from the drinking apparatus.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a drinking apparatus embodying the present invention;

FIG. 3 is an enlarged fragmented and partially sectional view taken generally along the line 3—3 of FIG. 1; and FIG. 4 is an enlarged sectional view taken generally along the line 4—4 of FIG. 1.

DETAILED DESCRIPTION OF THE PREFERRED EMBODIMENT

Figure 2:
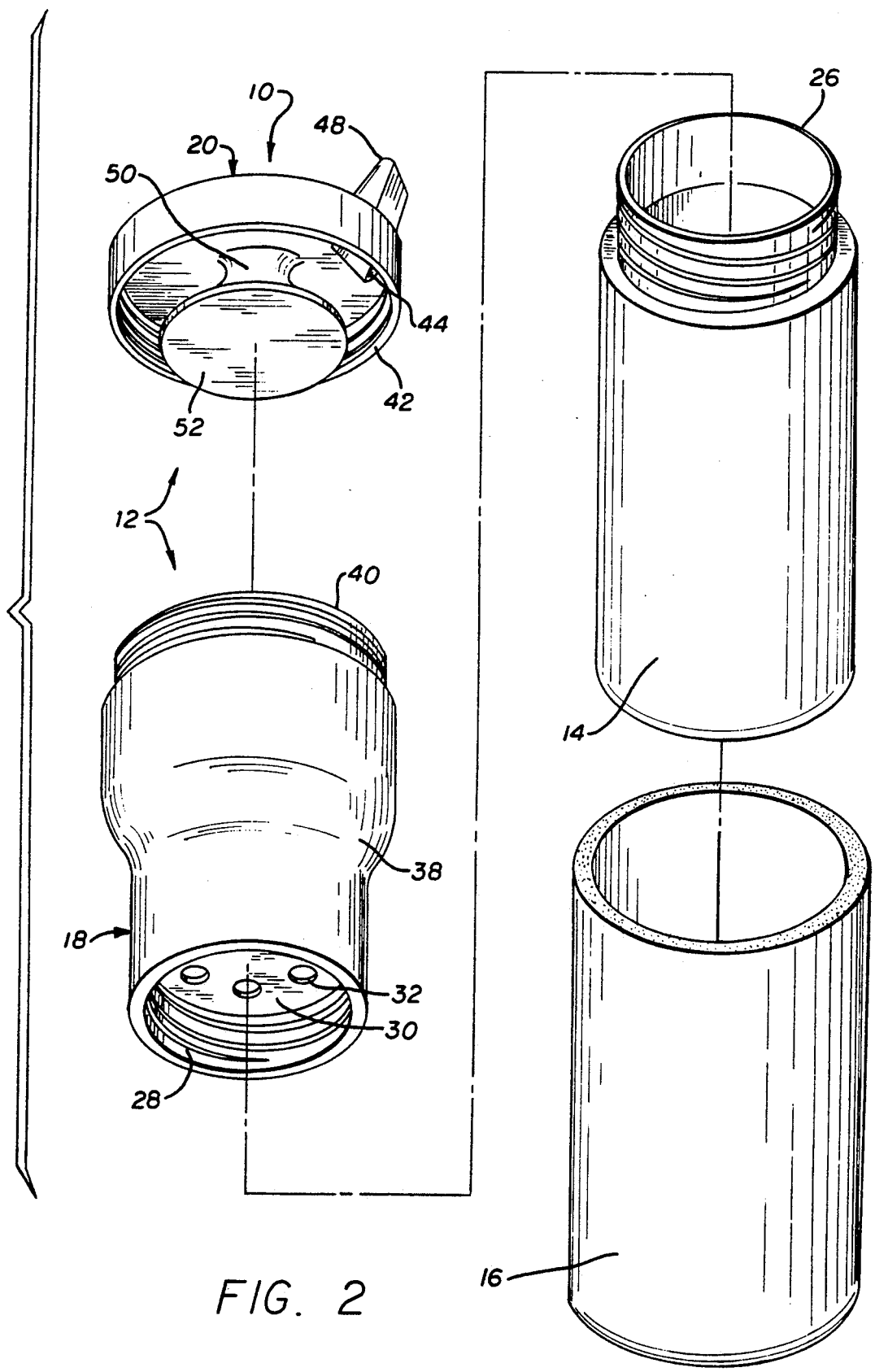
FIG. 2 is an enlarged exploded perspective view of the drinking apparatus illustrated in FIG. 1, showing the manner in which a cap fits over the top of an apparatus housing which, in turn, is threaded onto the top of a drinking bottle.

As shown in the drawings for purposes of illustration, the present invention is concerned with a novel drinking apparatus, generally designated in the accompanying drawings by the reference number 10. The drinking apparatus 10 comprises a novel drinking bottle attachment 12 secured to a beverage-containing bottle 14 which may have an insulating jacket 16 disposed about the bottle body. The drinking apparatus 10 of the present invention is primarily intended for separately storing a carbonated beverage and ice cream in close proximity to one another, and permitting the beverage and the ice cream to be selectively mixed to provide a drink having the flavor of an ice cream float.

In accordance with the present invention, and as illustrated in FIGS. 1 through 4, the bottle attachment 12 includes a housing 18 connected to the top of the bottle 14, and a cap 20 attached to the housing 18 opposite to the drinking bottle 14. The cap 20 and the housing 18 collectively define a chamber into which the ice cream 22 (illustrated in phantom in FIG. 3) is placed. Both the cap 20 and the housing 18 are preferably formed of a low thermal-conductivity material, to provide a suitable housing for a frozen substance such as the ice cream 22.

As shown best in FIGS. 2 and 3, the bottle 14 includes a cup-like body for storing the beverage 24, and an upper exteriorly threaded neck 26. The attachment housing 18 includes an interiorly threaded flange 28 at a lower end thereof, which is dimensioned to engage the threaded bottle neck 26 to secure the housing to the bottle 14. A barrier 30 is provided by the housing 18 adjacent to the lower flange 28, for separating the ice cream 22 from the beverage 24. A plurality of apertures 32 (see FIG. 4) provide means for permitting the beverage to flow past the barrier 30 into the housing 18. The apertures 32 define a flow path from the bottle 14 into the housing 18.

A lower platform 34 extends upwardly from the barrier 30 to provide a lower planar supporting surface 36 for the ice cream 22 within the housing 18. The lower platform 34 has a generally conical configuration and is positioned within the housing 18 such that only a relatively small space is provided between the lower platform 34 and a housing wall 38 to encourage intimate contact of the beverage 24 with the ice cream 22 and thorough mixing thereof as a drink is drawn from the drinking apparatus 10.

An upper end 40 of the housing 18 is threaded to engage an interiorly threaded flange 42 provided by the cap 20. This permits the cap 20 to be conveniently screwed onto or off from the housing 18, to place ice cream 22 within the housing.

The cap 20 includes an outlet aperture 44, which permits a drink to be drawn out of the bottle 14 through the housing 18, and a plurality of small air holes 46. A spout 48 surrounds the outlet aperture 44 and extends upwardly from the cap 20 to provide a convenient receptacle which can be placed in a user's mouth to facilitate drawing a drink from the drinking apparatus 10.

An upper platform 50 extends downwardly into the housing 18 to provide an upper planar supporting surface 52 for ice cream 22 placed within the housing 18. The upper and lower supporting surfaces 52 and 36 hold the ice cream 22 in a spaced relation relative to, respectively, the outlet aperture 44 and air holes 46, and the barrier apertures 32. This tends to ensure flow of the beverage from the bottle 14 through the housing 18 and out the outlet aperture 44, when desired. Like the lower platform 34, the upper platform 50 has a generally conical configuration and is dimensioned to provide only a relatively small space between the platform and the housing wall 38. This encourages intimate contact of the beverage 24 with the ice cream 22 and thorough mixing thereof as the drink is drawn from the drinking apparatus 10.

In use, the bottle 14 may or may not be placed within the insulating jacket 16. Use of the insulating jacket is entirely in the discretion of the user. The bottle 14 is filled with a selected quantity of the beverage 24, and then the housing 18 is attached to the bottle 14 through engagement of the lower flange 28 and the bottle neck 26. A measured quantity of ice cream 22 is then placed atop the planar supporting surface 36 of the lower platform 34 within the housing 18, and the cap 20 is attached to the housing through threaded engagement of the cap threaded flange 42 with the upper end 40 of the housing.

To attain the desired ice cream float flavor, a user simply places the spout 48 into his mouth and tilts the drinking apparatus 10 to cause the beverage 24 to flow through the barrier apertures 32 into the housing 18 and into engagement with the ice cream 22. As the beverage 24 flows past the ice cream, desirable mixing thereof occurs prior to the drink being drawn from the drinking apparatus 10 through the outlet aperture 44.

From the forgoing it is to be appreciated that the improved drinking apparatus 10 of the present invention provides a novel attachment to a drinking bottle for storing an edible frozen substance in close proximity to, but separately from, a beverage in the bottle 14. The attachment 12 permits the frozen substance (ice cream) to be selectively mixed with the beverage as the beverage is drawn from the bottle 14 by a user. By providing a separate chamber within the housing 18 for the ice cream 22, the desired "float" flavor of a drink drawn from the drinking apparatus 10 can be preserved to the maximum extent in an apparatus which is of relatively simple construction and very economical to produce. By eliminating right-corners in hard to reach locations, the bottle attachment 12 is easy to clean, thus facilitating reuse of the attachment 12.

Although a particular embodiment of the invention has been described in detail for purposes of illustration, various modifications may be made without departing from the spirit and scope of the invention. Accordingly, the invention is not to be limited, except as by the appended claims.

I claim:

1. A drinking apparatus for separately storing a carbonated beverage and ice cream in close proximity to one another, and selectively mixing the beverage and the ice cream to provide a drink having the flavor of an ice cream float, the drinking apparatus comprising:

a bottle including a cup-like body for storing the beverage, and a threaded neck;

a bottle attachment housing for storing the ice cream, including a threaded flange at one end dimensioned to engage the threaded bottle neck to secure the attachment housing to the bottle, a barrier adjacent to the threaded flange for separating the ice cream from the beverage, means for permitting the beverage to flow past the barrier into the housing, a lower platform extending upwardly from the barrier for supporting the ice cream within the housing, and a second threaded housing end opposite to the housing threaded flange; and a housing cap including a threaded flange dimensioned to engage the second threaded housing end to secure the cap to the housing, and an aperture for permitting the drink to be drawn from the drinking apparatus, wherein the cap and the housing define a chamber for the ice cream.

2. A drinking apparatus as set forth in claim 1, wherein the means for permitting the beverage to flow past the barrier includes a plurality of apertures through the barrier defining a flow path from the bottle into the chamber for the ice cream.

3. A drinking apparatus as set forth in claim 1, wherein the cap aperture comprises a spout extending generally upwardly from the cap, which may be placed in a user's mouth to facilitate drawing a drink from the drinking apparatus.

4. A drinking apparatus as set forth in claim 1, including an insulating jacket disposed about the bottle body.

5. A drinking apparatus as set forth in claim 1, wherein the cap includes an upper platform extending downwardly into the chamber for supporting the ice cream within the housing and for holding the ice cream in a spaced relation relative to the cap aperture.

6. A drinking apparatus as set forth in claim 5, wherein the upper and lower platforms have facing planar surfaces for supporting the ice cream within the chamber, and are configured to each have a generally conical configuration.

7. A drinking apparatus as set forth in claim 6, wherein the upper and lower platforms are configured such that a relatively small space is provided between the platforms and a housing wall to encourage intimate contact of the beverage with the ice cream and thorough mixing thereof as the drink is drawn from the drinking apparatus.

8. A drinking apparatus as set forth in claim 1, wherein the housing and the cap are formed of a low thermal-conductivity material.

9. An attachment to a drinking bottle for storing an edible frozen substance in close proximity to, but separately from, a beverage in the bottle, and for selectively mixing the frozen substance and the beverage as the beverage is drawn from the bottle, the attachment comprising:

a housing including means for connecting the attachment to the drinking bottle;

a cap attached to the housing opposite to the drinking bottle, the cap and the housing defining a chamber into which the frozen substance is placed;

platform means within the chamber for holding the frozen substance in a spaced relation relative to the cap and the bottle; and an outlet through the cap for permitting the beverage to be drawn out of the bottle through the housing.

10. An attachment to a drinking bottle as set forth in claim 9, wherein the means for connecting the attachment to the drinking bottle includes a threaded flange at one end of the housing, dimensioned to engage a threaded bottle neck.

11. An attachment to a drinking bottle as set forth in claim 10, wherein the housing includes a second threaded housing end opposite to the housing threaded flange, and the cap includes a threaded flange dimensioned to engage the second threaded housing end to secure the cap to the housing.

12. An attachment to a drinking bottle as set forth in claim 9, wherein the platform means includes a lower platform supported within the housing and extending generally upwardly relative to the housing threaded flange, and an upper platform supported by the cap and extending downwardly into the chamber, wherein the upper and lower platforms have facing planar surfaces for supporting the frozen substance within the chamber.

13. An attachment to a drinking bottle as set forth in claim 12, wherein the upper and lower platforms are configured such that a relatively small space is provided between the platforms and a housing wall to encourage intimate contact of the beverage with the frozen substance and thorough mixing thereof as the beverage is drawn from the bottle through the drinking apparatus.

14. An attachment to a drinking bottle as set forth in claim 12, wherein the housing includes a barrier adjacent to the housing threaded flange for separating the frozen substance from the beverage, the barrier including a plurality of apertures therethrough defining a flow path from the bottle into the chamber for the frozen substance.

15. An attachment to a drinking bottle as set forth in claim 9, wherein the outlet comprises a spout fixed to the cap and extending upwardly therefrom, which may be placed in a user's mouth to facilitate drawing the beverage from the attachment.

16. An attachment to a drinking bottle as set forth in claim 9, wherein the housing, the cap and the platform means are formed of low thermal-conductivity materials.

17. A drinking apparatus for separately storing a carbonated beverage and ice cream in close proximity to one another, and selectively mixing the beverage and the ice cream to provide a drink having the flavor of an ice cream float, the drinking apparatus comprising:

a bottle including a cup-like body for storing the beverage, and a threaded neck;

a bottle attachment housing for storing the ice cream and formed of a low thermal-conductivity material, including a threaded flange at one end dimensioned to engage the threaded bottle neck to secure the attachment housing to the bottle, a barrier adjacent to the threaded flange for separating the ice cream from the beverage, a plurality of apertures through the barrier providing means for permitting the beverage to flow past the barrier into the housing and defining a flow path from the bottle into the bottle attachment housing, a lower platform extending upwardly from the barrier for supporting the ice cream within the housing, and a second threaded housing end opposite to the housing threaded flange; and a housing cap including a threaded flange dimensioned to engage the second threaded housing end to secure the cap to the housing such that the cap and the housing define a chamber for the ice cream, a spout extending upwardly from the cap which may be placed in a user's mouth to facilitate drawing a drink from the drinking apparatus, and an upper platform extending downwardly into the chamber for supporting the ice cream within the housing and for holding the ice cream in a spaced relation relative to the spout;

wherein the upper and lower platforms have facing planar surfaces for supporting the ice cream within the chamber, and are configured to each have a generally conical configuration and provide a relatively small space between the platform and a housing wall to encourage intimate contact of the beverage with the ice cream and thorough mixing thereof as the drink is drawn from the drinking apparatus.

* * * * *